J. MILLER, Sr.
PLUMBER'S TRAP.
APPLICATION FILED SEPT. 18, 1915.
1,211,210.
Patented Jan. 2, 1917.
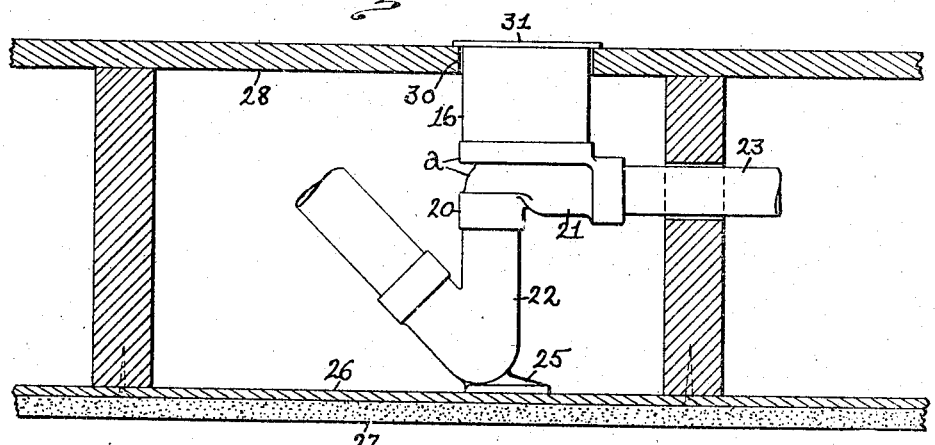
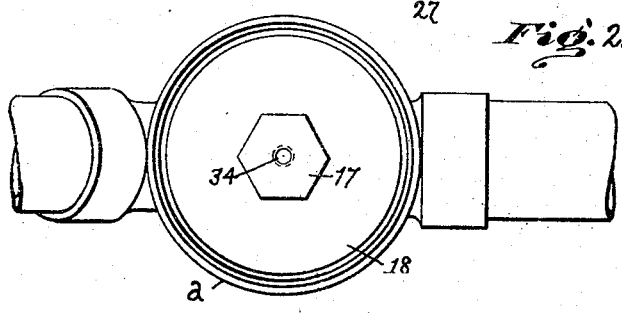
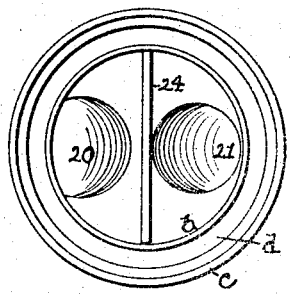
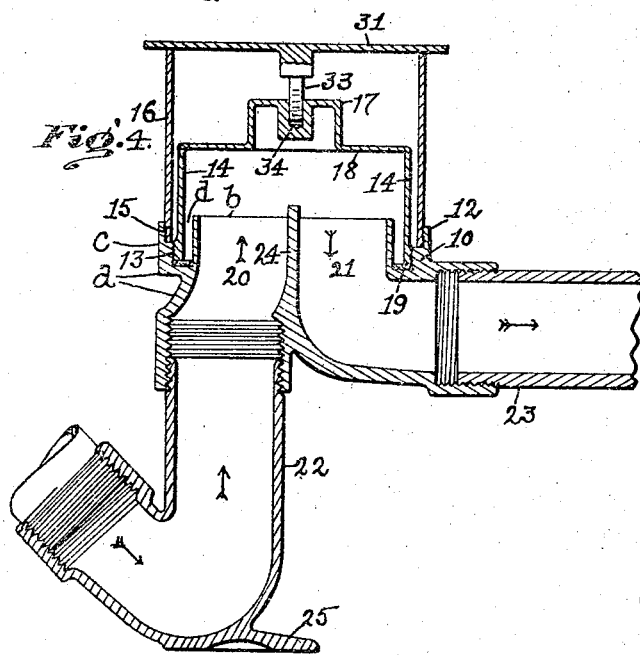
Inventor:
John Miller, Sr.
By Jas. H. Churchill
Atty.

UNITED STATES PATENT OFFICE.

JOHN MILLER, SR., OF BOSTON, MASSACHUSETTS, ASSIGNOR TO UNITED UTILITIES COMPANY, OF BOSTON, MASSACHUSETTS, A CORPORATION OF MASSACHUSETTS.

PLUMBER'S TRAP.

1,211,210.

Specification of Letters Patent.

Patented Jan. 2, 1917.

Application filed September 18, 1915. Serial No. 51,461.

*To all whom it may concern:*

Be it known that I, JOHN MILLER, Sr., a citizen of the United States, residing in Boston, in the county of Suffolk and State of Massachusetts, have invented an Improvement in Plumbers' Traps, of which the following description, in connection with the accompanying drawings, is a specification, like characters on the drawings representing like parts.

This invention relates to a plumber's trap for use in connection with sinks, toilet bowls, and the like, in which the cover is in screw-threaded engagement with the body portion of the trap.

The invention is especially designed and adapted to be embodied in a trap which is located below the floor of a room and between the latter and the ceiling of a room below that in which the trap is located.

The invention has for its object to provide a trap, which is capable of being located between the ceiling and the floor and which is provided with a water seal for the screw-threaded connection of the cover or cap of the trap with the body portion thereof, and also is provided with a reservoir which is external to the cover or cap and permits the latter to be removed for the purpose of cleaning out the trap without danger of the water overflowing the trap and damaging the ceiling below.

The reservoir referred to is made separate from the body of the trap, so that reservoirs of different holding capacities can be used with the same body portion, according to the head room between the ceiling and the floor.

Provision is also made for detachably securing the floor plate to the cap or cover of the trap.

These and other features of this invention will be pointed out in the claims at the end of this specification.

Figure 1 represents a sufficient portion of a building provided with a trap embodying this invention to enable the invention to be understood. Fig. 2, a plan view of the trap shown in Fig. 1. Fig. 3, a plan of the body portion of the trap with the cap and reservoir removed, and Fig. 4, a vertical central section of the trap shown in Fig. 1.

Referring to the drawings, $a$ represents the body portion of the improved trap, which may be made of brass or other suitable metal.

The body portion $a$ is provided within it with a cylindrical flange $b$, which coöperates with the cylindrical upper wall $c$ of the body portion to form between them an annular well $d$ for the reception of water, which forms a water seal, as will be described. The cylindrical wall $c$ of the body portion $a$ is preferably made of different internal diameters, it having a thicker lower portion 10 of smaller diameter and a thinner upper portion 12 of larger diameter. The lower portion 10 is provided on its inner surface with screw-threads 13, which are engaged by the externally threaded lower end of a cylindrical cap or cover 14, and the upper portion 12 is also provided with internal screw-threads 15, which are engaged by the externally threaded lower end of a cylinder 16, which may be made of any desired length within limits, and is preferably made longer than the cap 14 so as to project beyond the angular central portion 17 formed on the upper end wall 18 of said cap, for a purpose as will be described.

The cylindrical flange $b$ of the body portion $a$ coöperates with the thicker portion 10 of the wall $c$ to form the annular well $d$, upon the bottom wall of which rests an annular packing ring 19, with which the lower edge of the cylindrical cap or cover 14 engages to make a fluid-tight joint, which is sealed by the water in the well $d$.

The body portion $a$ is provided with a fluid inlet port or passage 20 and with a fluid outlet port or passage 21, with which inlet and outlet pipes 22, 23, may be respectively connected in any suitable or desired manner, and between said inlet and outlet ports is located a partition wall 24, which may and preferably will be extended above the upper edge of the cylindrical flange $b$, to form a dam and insure the water overflowing said flange so as to fill the well $d$ and form a water seal.

The inlet pipe 22 may be provided with a flange 25, which forms a bearing surface or foot for the trap, which is designed to rest upon a suitable support, and in Fig. 1, said foot is shown as resting upon the laths 26 of the ceiling 27 of a room located below the floor 28 of the room containing the toilet bowl, bath tub or other water receptacle with which the trap is connected in a manner well understood.

The floor 28 is provided with the usual hole or opening 30 through which access may be had to the cover of the trap, and which opening is normally covered by a floor plate or disk 31, which may be detachably secured to the cover 14 of the trap, so as to avoid the use of screws now commonly employed and which are inserted through the ordinary floor plate into the floor 28.

In the present instance, the floor plate 31 is provided on its under surface with a screw or threaded rod 33, which is designed to enter a threaded socket 34 in the annular portion 17 of the cap or cover, so that when it is desired to close the opening 30 in the floor, it is only necessary to insert the screw 33 in its socket 34 and turn the floor plate until it engages the floor 28 or the cylinder 16. This construction is also of advantage when the floor is made of other materials than wood, as, for instance, metal, concrete or tile. The removable cylinder 16 may and preferably will be made long enough to extend into the opening 30 in the floor, and preferably substantially flush with the surface of the latter so that the floor plate 31 may contact therewith.

The cylinder 16 forms a reservoir of materially greater holding capacity than the sealing well $d$ and permits the cover or cap 14 to be removed so as to gain access to the interior of the body portion of the trap, without danger of the ceiling 27 being damaged by water in the trap overflowing onto the ceiling. The reservoir 16 also permits the water to flow into the trap so as to help free any obstruction therein, without danger of damaging the ceiling, as the flow can be controlled by the operator so as to prevent the water rising to the height of the reservoir and yet provide sufficient water for flushing purposes.

Inasmuch as the head-room between the ceiling and the floor varies in different houses or buildings, the reservoir or cylinder 16 can be adjusted to the head-room by employing a cylinder of the proper length or cutting off a long cylinder, so that the trap can be made of a standard size, and reservoirs of different lengths can be used with the standard trap to meet the requirements as to the head-room available in the particular situation.

In operation under normal conditions, the water flows through the trap in the direction indicated by the arrows, and by means of the dam rises to a level which insures the well $d$ being filled to form the water seal. Under abnormal conditions, that is, in case the outlet pipe becomes more or less obstructed, the water may rise in the reservoir above the level of the body portion of the trap, and yet the trap can be opened by removing the floor plate 31 and cover 14, without danger of the water overflowing the trap proper and onto the ceiling or onto the floor of a room in which the trap is located above the floor, as for instance, in kitchens and the like.

A water-tight joint between the cylinder 16 and the body portion $a$ of the trap may be obtained by leading the screw-threads 15 in a manner well understood.

I have herein shown one embodiment of the invention, which may be preferred, but it is not desired to limit the invention to the particular construction shown.

I claim:

1. In a trap of the character described, in combination, a body portion provided with a cylindrical upper wall of different thicknesses and having internal screw-threads, an annular flange within said wall forming with the thicker portion thereof a well to receive water and form a water seal, a cap having external screw-threads at its lower end in engagement with the internally threaded thicker portion of said upper wall, and a cylindrical reservoir having external screw-threads at its lower end in engagement with the internally threaded thinner portion of said upper wall, said body portion having an inlet port and an outlet port and a partition wall forming a dam between said ports.

2. In a trap of the character described, in combination, a body portion provided with a cylindrical upper wall and with a cylindrical flange of smaller diameter forming with said upper wall a water-receiving annular well, a removable cap extended into said well and having its lower end in threaded engagement with one of the walls of said well, and a removable cylinder surrrounding said cap and having its lower end in threaded engagement with said upper wall, said body portion having an inlet port, an outlet port and a partition wall forming a dam between said ports.

3. In a trap of the character described, in combination, a body portion provided with an annular upper wall and an annular flange of smaller diameter than said upper wall and forming therewith a water-receiving well, a cap having its lower end in threaded engagement with one of said walls, and a reservoir attached to the said outer wall and extended above said cap.

4. In a trap of the character described, in combination, a body portion provided with an annular upper wall and an annular flange of smaller diameter than said upper wall and forming therewith a water-receiving well, a cap having its lower end in threaded engagement with one of said walls, a reservoir attached to the said outer wall and extended above said cap, and a floor plate provided on its under side with a threaded rod in engagement with a threaded socket in said cap.

5. In a trap of the character described, in combination, a body portion provided with an annular upper wall and an annular flange of smaller diameter than said upper wall and forming therewith a water-receiving well, a cap having its lower end in threaded engagement with one of said walls, and a cylinder removably secured at its lower end to said outer wall and extended above said flange to form a reservoir.

6. In a trap of the character described, in combination, a body portion provided with an annular upper wall and an annular flange of smaller diameter than said upper wall and forming therewith a water-receiving well, a cap having its lower end in threaded engagement with one of said walls, and a reservoir in threaded engagement with said outer wall.

In testimony whereof, I have signed my name to this specification.

JOHN MILLER, Sr.

Copies of this patent may be obtained for five cents each, by addressing the "Commissioner of Patents, Washington, D. C."